United States Patent [19]

Reinartz et al.

[11] Patent Number: 5,231,913
[45] Date of Patent: Aug. 3, 1993

[54] PROCESS FOR THE ADJUSTMENT OF A BRAKE POWER BOOSTER TRAVEL SENSOR

[75] Inventors: Hans-Dieter Reinartz, Frankfurt am Main; Helmut Steffes, Hattersheim; Stefan Risch, Wiesbaden, all of Fed. Rep. of Germany

[73] Assignee: Alfred Teves GmbH, Frankfurt am Main, Fed. Rep. of Germany

[21] Appl. No.: 934,538
[22] PCT Filed: Feb. 5, 1991
[86] PCT No: PCT/EP91/00214
§ 371 Date: Oct. 6, 1992
§ 102(e) Date: Oct. 6, 1992
[87] PCT Pub. No.: WO91/15387
PCT Pub. Date: Oct. 17, 1991

[30] Foreign Application Priority Data

Apr. 6, 1990 [DE] Fed. Rep. of Germany ....... 4011165

[51] Int. Cl.⁵ ................ F01B 25/26; F01B 31/12
[52] U.S. Cl. ............................. 92/5 R; 91/1
[58] Field of Search ........... 92/5 R, 128; 91/369.1, 91/376 R

[56] References Cited

U.S. PATENT DOCUMENTS 4,365,538  12/1982  Andoh .
5,141,295  8/1992  Burgdorf et al. ............ 92/5 R

FOREIGN PATENT DOCUMENTS 0352392  1/1990  European Pat. Off. .
2851264  6/1979  Fed. Rep. of Germany .
2840836  4/1980  Fed. Rep. of Germany .
3226579  12/1983  Fed. Rep. of Germany .
3731603  5/1988  Fed. Rep. of Germany .
3918012  12/1990  Fed. Rep. of Germany .
0167861  10/1982  Japan ........................... 91/1
8910862  11/1989  PCT Int'l Appl. .
2030651  4/1980  United Kingdom .
2197402  5/1988  United Kingdom .

Primary Examiner—Thomas E. Denion
Attorney, Agent, or Firm—Robert P. Seitter; J. Gordon Lewis

[57] ABSTRACT

A process for adjusting the travel sensor for a brake power booster movable wall is disclosed to compensate for tolerance variations, in which a fixed stop is installed to engage the output member upon applying a predetermined input force to shift the movable wall to a test location. The distance to the test location of the movable wall from a booster housing reference surface is measured with a measuring instrument installed temporarily in the booster housing opening normally receiving the travel sensor. The tips of the travel sensor is positioned at the test location with the travel sensor in the corresponding signal condition either by using an appropriately dimensioned replaceable tip or sensor holder, or by use of an adjustable length sensor holder.

8 Claims, 3 Drawing Sheets

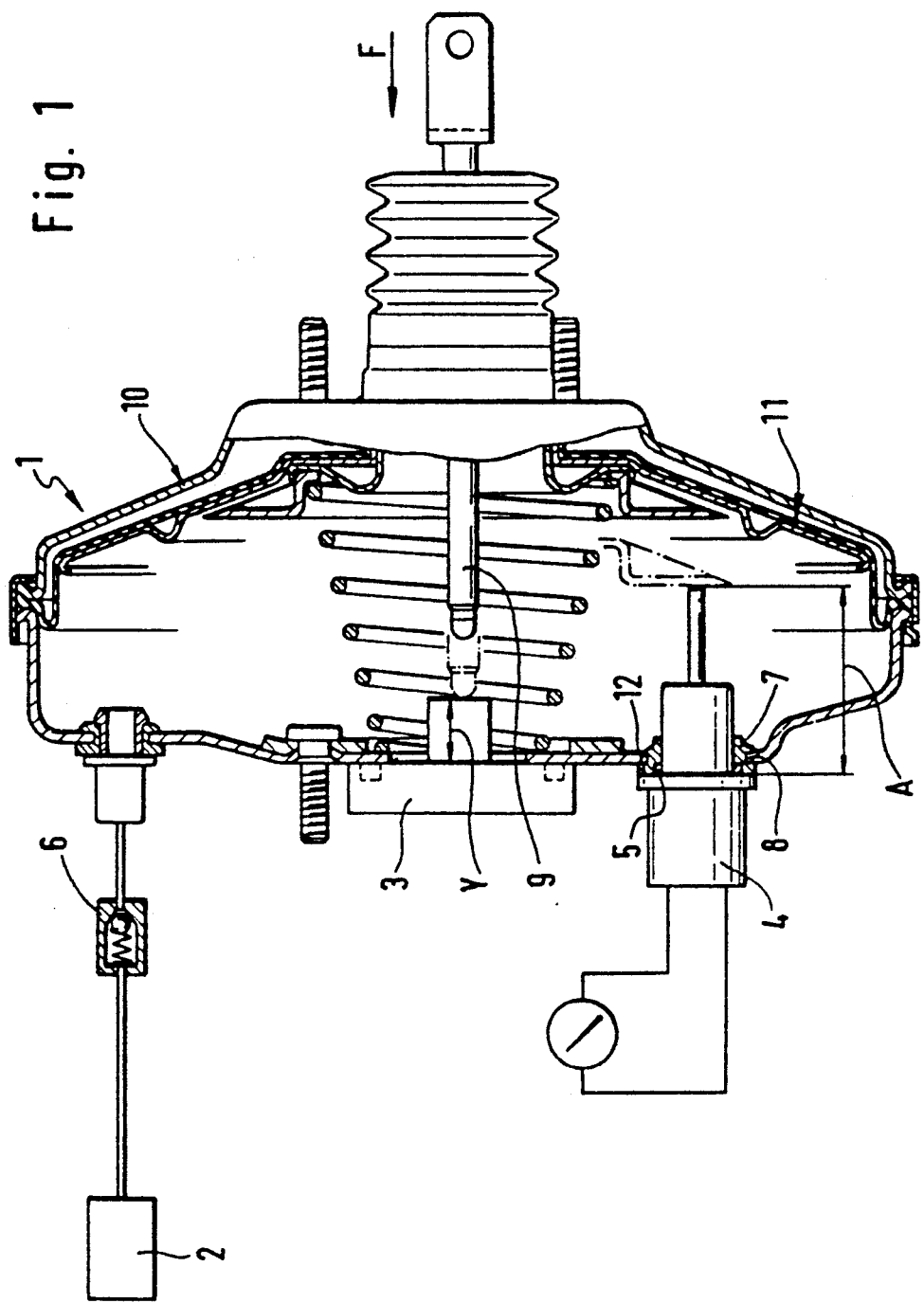

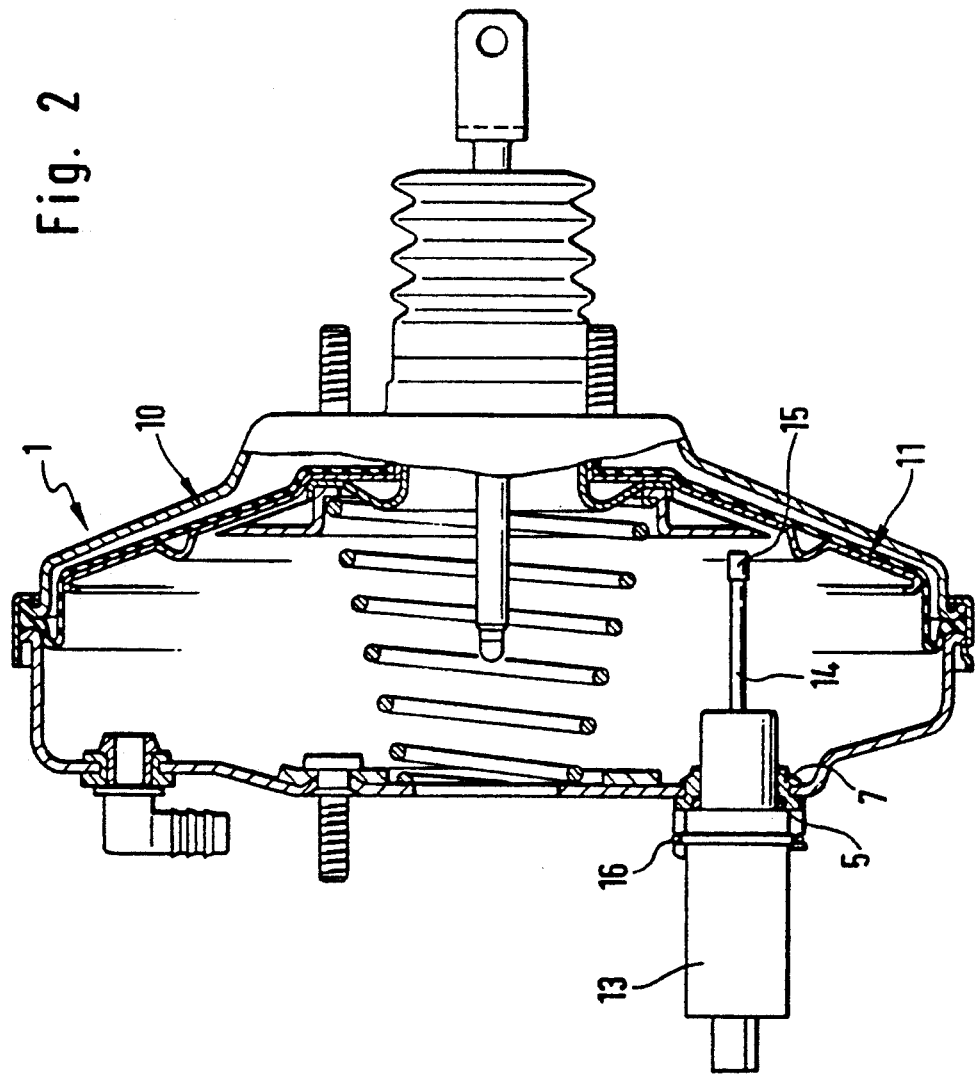

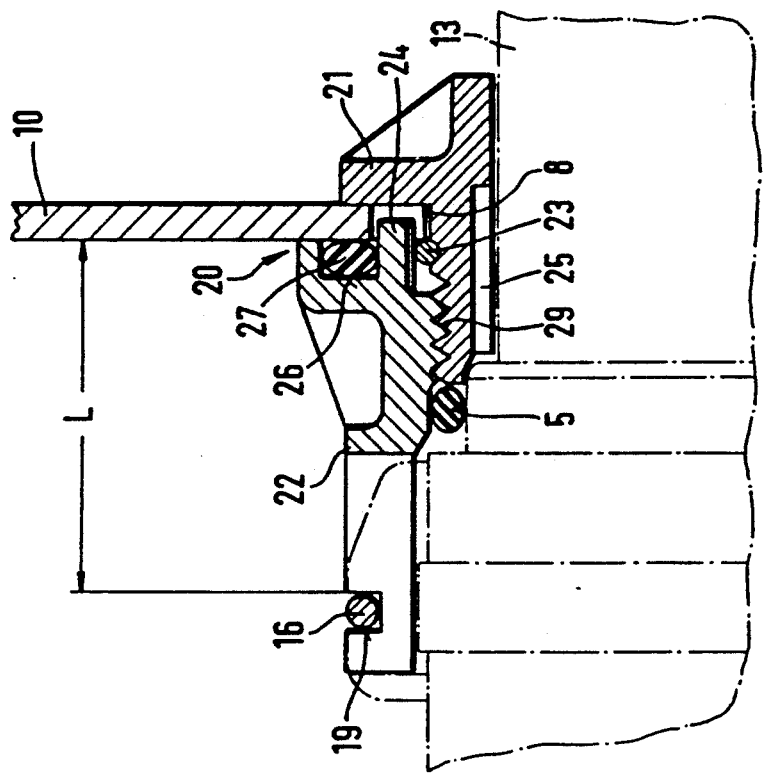
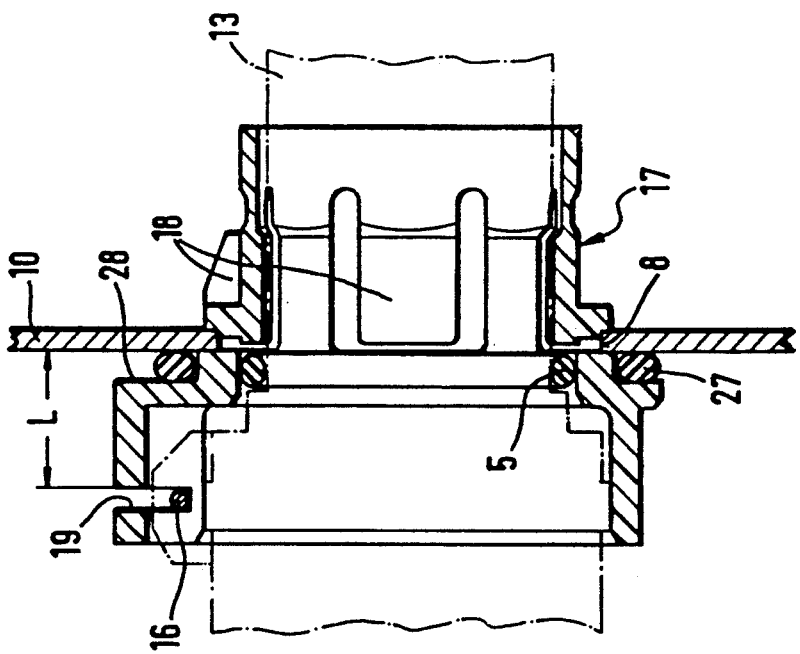

PROCESS FOR THE ADJUSTMENT OF A BRAKE POWER BOOSTER TRAVEL SENSOR

BACKGROUND OF THE INVENTION

The invention is related to a process for the adjustment of a travel sensor for a vacuum brake booster for automotive vehicle brake systems having an anti-locking device. The electrical travel sensor monitors the position of a movable wall which furnishes the boosting power of the vacuum brake power booster. In particular, the invention relates to a process for the adjustment of the desired axial distance between an actuating element of the travel sensor and the movable wall.

It is, for example, known from the German patent application published without examination, No. 3,731,603, corresponding to U.S. Pat. No. 4,826,255, to sense the position of the movable wall in order to safeguard the regular functioning of brake systems with anti-locking device which work as "open" systems. U.S. Pat. No. 5,141,295 filed on Dec. 19, 1989 assigned to the assignee of this application also describes such movable wall sensor for a brake power booster for this purpose.

In these arrangements, a rotary hydraulic pump is provided, which, in one control mode, aspirates hydraulic fluid out of an unpressurized supply tank, and with the wheel valves in the closed condition, delivers the same into the master brake cylinder in order to properly position the brake pedal. For this purpose, a travel sensor, for example, a travel-controlled electric switch, is envisaged which supplies an electrical signal depending on the position of the movable wall to an electronic control system which controls the pumping rate of the pump.

The vacuum brake power booster, in particular its housing, is subject to sizable working tolerances which have a negative effect on the functioning of the travel sensor and, in an extreme case, may even lead to the total failure of the brake system.

It is, therefore, the object of the invention to provide a process for the adjustment of the exact position of the electrical travel sensor in respect of the movable wall of a vacuum brake power booster, which affords a virtual elimination of the influence of its working tolerances on the functioning of the travel sensor.

SUMMARY OF THE INVENTION

According to the invention, this object is achieved by the following process steps:

a) installing a stop in the booster housing for the output member driven by the booster movable wall, the stop having a defined length;

b) applying a vacuum to the vacuum chamber in the booster housing;

c) actuating the vacuum brake power booster by applying a predetermined input force which shifts the position of the movable wall to abut the output member with the stop and bring the movable wall to a test location;

d) determining the distance between a reference surface at the booster housing and the movable wall at the test location;

e) comparing the distance in step d) to a distance from a reference surface of the travel sensor to the tip of an actuating element with the tip located at a point located so that the travel sensor signal output corresponds to the test location of the movable wall;

f) installing the travel sensor in the booster housing while locating the travel sensor reference surface by means of the booster housing reference surface using a suitable spacing means to locate the tip of the actuating element at the test location of the movable wall with said travel sensor actuating element set in said travel sensor at said location corresponding to said test location.

The spacing means employed can be the selection of a replaceable tip sized to create the appropriate spacing distance.

Another spacing means can be provided by selecting a properly sized holder installed in the booster housing with the travel sensor assembled into the holder. The holder can also be adjustable to vary the location of the installed travel sensor. By these two latter operations an exchange of the travel sensor will be simplified, and the advantage offered by this approach consists in that in this case, the adjustment is carried out at the brake power booster whose condition is no longer changed. In the former approach using replaceable tips, the adjustment is carried out at the travel sensor, so that it must be carried out again in the event the travel sensor is replaced.

DESCRIPTION OF THE DRAWINGS

FIG. 1 is a partially sectional view of a power booster and a diagrammatic representation of a measuring arrangement for carrying out the inventive process;

FIG. 2 is a partially sectional view of a power booster and travel sensor which has been adjusted in accordance with the invention;

FIG. 3 is an enlarged, fragmentary, and partially sectional view of a first embodiment of a sensor accommodating element positioning the travel sensor; and FIG. 4 is an enlarged, fragmentary, and partially sectional view of a second embodiment of the sensor accommodating element.

DETAILED DESCRIPTION

FIG. 1 shows a vacuum brake power booster 1 which is to be equipped with a travel sensor, not shown in the drawing, which is connected through a non-return valve 6 to a vacuum source 2. The booster housing 10 is sealed to be airtight. A diagrammatically illustrated stop 3 having a portion projecting into the booster housing 10 of defined length Y, is installed during the measuring procedure. The stop 3 serves to engage a power output member 9 transmitting the output power of the vacuum brake power booster 1, with a predetermined input force F exerted on the input member of the booster.

Simultaneously, a sensor accommodating element 7 is inserted in an opening 8 being provided in the booster housing 10, the opening 8 accommodating installation of the aforementioned travel sensor after the adjustment process is complete.

In the course of the measuring procedure, a measuring instrument 4 is introduced through the sensor accommodating element 7 and sealed off by means of a seal 5. The function of the measuring instrument 4 consists in determining, at a fixed moment with the movable wall 11 at a test location with the input force F applied and the output member 9 against the stop 3, the distance A between a travel sensor mounting reference surface which is defined at the booster housing 10, i.e., between the front face 12 of the sensor accommodating element 7, on one hand, and a movable wall 11 which exerts the boosting power of the vacuum brake power booster 1 on the output member 9. The predetermined known input force F having been applied to the input member, the movable wall 11 is advanced so that the power output member 9 is caused to be slid in the direction of the stop 3 until the power output member 9 abuts against the stop 3. As a result, the movable wall 11 comes to be positioned in an advanced test location shown in phantom lines.

The axial distance A between the front face 12 of the sensor accommodating element 7 and the movable wall 11 corresponding to that position is compared to a functional length measure of the travel sensor 13 (FIG. 2) to be used whose actuating element 14 interacts with the movable wall 11 during operation. The said functional parameter preferably corresponds to the distance from a reference surface on the travel sensor 13 to the tip of the actuating element 14 at the moment when a predetermined signal output of the travel sensor 13 is reached, corresponding to the test location of the movable wall 11.

Subsequently, the correct length of a spacing element, for example of a spacing cap 15, is determined on the basis of the result of the forementioned comparison. In order to facilitate the correlation of the spacing caps 15 of different length to the results of the comparison, it is envisaged that a defined color corresponds to each length measure of the spacing caps 15, for example red, green, blue or white. Upon the selection of the right spacing cap 15, the latter is plugged onto the end of the actuating element 14 and the travel sensor 13 is introduced into the sensor accommodating element 7 and secured against sliding by means of a retaining ring 16. This completes the adjusting procedure.

FIG. 3 shows a first embodiment of a sensor accommodating element 17 which corresponds to a positioning of the travel sensor 13 in respect of the movable wall 11 mentioned before and not shown in the drawing, so that the adjustment is carried out directly at the vacuum brake power booster housing 11. For this purpose, for example four groups of sensor holders 17 of different dimensions are furnished one of which is selected depending on the distance between the aforementioned reference surface and the movable wall 11. In this case, the reference surface is constituted by the surface of the booster housing 10 which accommodates the travel sensor 13. As will be seen in FIG. 3, the sensor holder 17 is provided projecting into the inner space of the booster housing 10 with a plurality of locking projections 18 which in the mounted condition of the sensor holder 17 within the booster housing 10 catch behind the edge of the opening 8 which is provided for the purpose.

An elastic seal, preferably an O-ring 27, which is positioned between the surface of the booster housing 10 and an annular surface 28 on the sensor holder 17 provide effective sealing of the sensor 17 to the booster housing 10. In order to fix the travel sensor 13 in the sensor holder 17 upon its mounting, the portion protruding outside the booster housing 10 is formed, with a radial peripheral groove 19 which accommodates the retaining ring 16 holding the travel sensor 13. The distance L between the surface of the booster housing 10 and the flank of the peripheral groove 19 which is positioned nearer to the booster housing 10 is the dimension defining the proper holder 17 to achieve proper adjustment of the travel sensor.

The sensor holder 17 may be fixed within the booster housing 10 by other means such as, for example by a bayonet catch. For this purpose, the sensor holder 17 is furnished, for example, with a plurality of radial projections which are inserted into matching clearances in the booster housing 10, whereupon the sensor holder 17 is rotated so that the projections again are engaged behind the edge of the opening 8, the seal which seals off the sensor accommodating element furnishing the necessary prestressing and retaining force for the bayonet locking.

The sensor holder assembly 20 shown in FIG. 4 affords adjustment of its overall length to properly locate the tip of the travel sensor 13. It is composed of a first part 21 which is passed through the booster housing opening 8 from the inside, and of a second part 22 which is positioned outside the booster housing 10. The first and second parts 21, 22 are coupled to each other by means of a threaded union 29.

In the course of mounting of the illustrated sensor accommodating assembly 20, the first part 21 is plugged through the opening 8 and is secured against falling out by means of a spring ring 23. After determining the above-mentioned distance "A" between the movable wall and the reference surface at the booster housing 10, and upon having fixed the length "L" which determines the position of the mounted travel sensor 13, the second part 22 is screwed onto the first part 21, the first part 21 being rotated with a tool (not shown) engaging with grooves 25. In the final phase of threaded advance, a nose 24 at the end of the second part 22 facing the first part 21, enters a gap being provided in the booster housing 10 adjacent opening 8. The nose 24 after entering the opening prevents the second part 22 from rotating, to constitute an antirotation means.

In this design version, the seal 27 which seals the second part 22 to the booster housing 10 is positioned in an annular groove 26 in the front side of the second part 22 which faces the booster housing 10. The groove flanks are inclined so that the seal 27 cannot fall out of the annular groove 26 in the course of mounting As soon as the length "L" defined before is reached by threading of part 22 on part 21, the adjusting procedure is ended, so that the travel sensor 13 can be inserted and be located and secured by means of the retaining ring 16. In this context, the front face of the first part 21 which faces away from the inner space of the booster housing 10 serves as a supporting surface for the seal 5 which seals off the travel sensor 13 in respect of the sensor holder assembly 20.

We claim:

1. A process for the adjustment of a vacuum brake power booster having a booster housing, a movable wall in said housing subject on one side to a vacuum to create an output force, an input member, and output member connected to said movable wall, and an associated electrical travel sensor for monitoring the position of said movable wall, in which the axial distance between an actuating element of said travel sensor and said movable wall is adjusted, characterized by the steps of:

a) mounting a stop having a defined length into said booster housing of said vacuum brake power booster so as to be engaged by said output member upon advance of said movable wall;

b) applying a vacuum to one side of said movable wall in said booster housing;

c) actuating said vacuum brake power booster by applying a predetermined input force to said input member to advance the position of the said movable wall and cause said power output member to abut said stop and locate said movable wall at a test location;

d) determining of the distance between a reference surface against which the travel sensor is to be mounted and said movable wall at said test location;

e) comparing the distance determined in step d) to the distance between a reference surface on said travel sensor and the tip of an actuating element of said travel sensor with said tip positioned in said travel sensor at a location corresponding to said test location of said movable wall;

f) installing said travel sensor against a locating surface fixed with respect to said booster housing and spaced to locate said tip of said actuating element at said test location in said booster housing with said actuating element located in said travel sensor at a location corresponding to said test location.

2. The process according to claim 1 wherein in said installing step, said travel sensor is mounted abutting said booster housing reference surface, and a replaceable tip element is mounted on said actuating element of a dimension so as to locate the outermost surface of said tip of said actuating element at said test location.

3. The process according to claim 1 wherein in said installing step, a holder of proper dimensions is mounted in said booster housing travel sensor opening, located against a booster housing surface, and said travel sensor is mounted in said holder, so as to be accurately located axially with respect to said holder dimensions such as to locate said tip of said actuating element at said test location.

4. The process according to claim 2 wherein a series of tip elements are constructed of a range of sizes and a properly sized tip is selected from said series to locate said outmost surface of said tips closest to said test location.

5. The process according to claim 4 wherein each of said tip elements in said series is made with a different color to aid in said selection.

6. The process according to claim 3 wherein a series of holders is constructed of a range of sizes and a properly sized holder is selected to locate said tip of said actuating element at said test position.

7. The process according to claim 3 wherein each of said holders in said series is made of a different color.

8. The process according to claim 1 wherein a two piece holder is mounted in a booster housing opening, one part located against a surface adjacent said opening, and adjusting the other part axially with respect to said one part, and axially locating said travel sensor on said other part.

* * * * *